(12) United States Patent
Klimetschek et al.

(10) Patent No.: US 8,645,317 B1
(45) Date of Patent: Feb. 4, 2014

(54) MANAGING TAXONOMY RELATIONSHIPS IN A CONTENT REPOSITORY

(75) Inventors: Alexander Klimetschek, Berlin (DE); Lars Trieloff, Potsdam (DE)

(73) Assignee: Adobe Systems Incorporated, San Jose, CA (US)

( * ) Notice: Subject to any disclaimer, the term of this patent is extended or adjusted under 35 U.S.C. 154(b) by 22 days.

(21) Appl. No.: 13/360,888

(22) Filed: Jan. 30, 2012

(51) Int. Cl.
  *G06F 7/00* (2006.01)
(52) U.S. Cl.
  USPC .......................................................... 707/609
(58) Field of Classification Search
  USPC ................................................ 707/601, 609
  See application file for complete search history.

(56) References Cited

U.S. PATENT DOCUMENTS

| | | | |
|---|---|---|---|
| 8,086,608 B2 * | 12/2011 | Hampton | 707/737 |
| 8,370,352 B2 * | 2/2013 | Lita et al. | 707/736 |
| 2006/0106814 A1 * | 5/2006 | Blumenau et al. | 707/10 |
| 2007/0113289 A1 * | 5/2007 | Blumenau | 726/26 |
| 2007/0250487 A1 * | 10/2007 | Reuther | 707/3 |
| 2008/0052297 A1 * | 2/2008 | LeClair | 707/100 |
| 2009/0276753 A1 * | 11/2009 | Bouillet et al. | 717/105 |
| 2010/0211554 A1 * | 8/2010 | Reid et al. | 707/703 |
| 2012/0011118 A1 * | 1/2012 | Gleicher et al. | 707/736 |

* cited by examiner

*Primary Examiner* — James Trujillo
*Assistant Examiner* — Mohsen Almani
(74) *Attorney, Agent, or Firm* — Kilpatrick Townsend & Stockton LLP

(57) ABSTRACT

Exemplary embodiments involve a content management application executed by a processor modifying a taxonomy hierarchy of tags. A content repository includes at least one content item having a primary reference identifying a first tag of the taxonomy hierarchy. The first tag includes a first description. Modifying the taxonomy hierarchy invalidates the primary reference. The processor generates a secondary reference in the taxonomy hierarchy. The secondary reference is identified by the primary reference and identifies a second tag including the first description. The processor receives an input referencing the first tag by the primary reference. The processor directs the input to the second tag via the secondary reference.

17 Claims, 8 Drawing Sheets

MANAGING TAXONOMY RELATIONSHIPS IN A CONTENT REPOSITORY

TECHNICAL FIELD

This disclosure relates generally to computer software and more particularly relates to managing taxonomy relationships in a content repository.

BACKGROUND

Digital content can be stored in a content repository. Content items in a content repository can be organized using a taxonomy that includes tags identifying categories for the content. A taxonomy can include a classification of content items into categories.

The number of content items grouped using tags can greatly exceed the number of tags used to organize the content items. For example, a large number of content items, such as web pages, may be grouped into a small number of categories, represented by tags. Thus, the number of content items (i.e., web pages) can be much larger than the number of tags (i.e. categories). Moreover, the content items can be modified more frequently than the tags of the taxonomy. For example, content items such as web pages may be modified on a daily or weekly basis, while a group of tags may be modified when existing categories are no longer effective for organizing the information. Furthermore, content items and tags may be respectively managed by different entities with different access rights. For example, to ensure that the categories used to organize content items remains predictable over time, the ability to modify tags representing the categories may be restricted to a small number of entities, such as "librarians."

As a result, organizing content using tags can present challenges. Because the number of content items greatly exceeds the number of tags, storing references to tags in the metadata of a content item can often be more efficient than storing references to content items in a tag. However, having different access mechanisms for the tags and for the content items can prevent content items from being updated to reflect changes to the tags, thereby undermining the organization of content in the content repository. Furthermore, modifying content items to reflect changes to the tags can require processing-intensive searches and updates of large numbers of content items.

SUMMARY

Systems and methods are disclosed for managing taxonomy relationships in a content repository. An exemplary embodiment involves a processor modifying a taxonomy hierarchy of tags. A content repository includes at least one content item having a primary reference identifying a first tag of the taxonomy hierarchy. The first tag includes a first description. Modifying the taxonomy hierarchy invalidates the primary reference. The processor generates a secondary reference in the taxonomy hierarchy. The secondary reference is identified by the primary reference and identifies a second tag including the first description. The processor receives an input referencing the first tag by the primary reference. The processor directs the input to the second tag via the secondary reference.

These illustrative features are mentioned not to limit or define the disclosure, but to provide examples to aid understanding thereof. Additional embodiments are discussed in the Detailed Description, and further description is provided there. Advantages offered by one or more of the various embodiments may be further understood by examining this specification or by practicing one or more embodiments presented.

BRIEF DESCRIPTION OF THE FIGURES

These and other features, aspects, and advantages of the present disclosure are better understood when the following Detailed Description is read with reference to the accompanying drawings, where.

DETAILED DESCRIPTION

Figure 1:
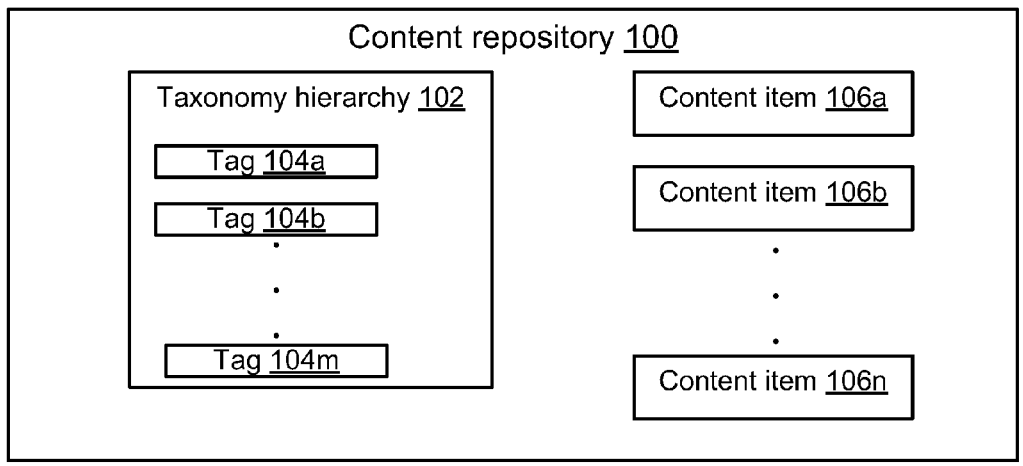
FIG. 1 is a modeling diagram illustrating a content repository having content items and a taxonomy hierarchy of tags.

Systems and methods are provided for managing taxonomy relationships in a content repository. The systems and methods can allow tags in a taxonomy hierarchy and referenced by content items in the content repository to be moved or modified without immediately making corresponding modifications to the associated content items.

The following example illustrates how a content management application or other software executed by a processor can manage taxonomy relationships in a manner that is transparent to an application accessing a taxonomy hierarchy. An application, such as a web browser, may access content, such a web page, stored in a content repository. The content repository can store both the content items and the tags used to describe and/or categorize the content items. The content items can include, for example, text documents, videos, images, style sheets, etc. A tag can describe or identify a category into which content can be grouped. The tags can be organized in a hierarchical manner. For example, a child tag (e.g., a tag with the identifier "Child") can describe a sub-category of a broad category described by a parent tag (e.g., a tag with the identifier "Parent"). The parent tag can identify or describe a broad category such as "animals" while a child tag can identify a sub-category such as "land animals," "sea animals," "chordates," "arachnids," etc. A content item can include a reference, such as a string of text, identifying the tag. Such a reference can identify a tag by, for example, its position in the hierarchy or by a unique tag identifier. A position in a hierarchy can include (but is not limited) a path to a content item in a content repository. For example, a content item may reference Child by the search string "Parent.Child." A content management application can cause references to a deleted tag to be ignored.

Different persons or other entities may be responsible for and have different access rights to the taxonomy hierarchy and the content items, respectively. An entity may be able to modify the tags of the taxonomy hierarchy, but not references to the tags included in the content items. Accordingly, modifying a position of a tag in the taxonomy hierarchy may invalidate a reference to a tag. For example, if the tag Child is changed from a child of the tag Parent to a child of the tag StepParent, a reference to "Parent.Child" would no longer identify the position of the tag Child in the taxonomy hierarchy.

To resolve this problem, the taxonomy hierarchy can be modified in such a way that otherwise invalid references can be resolved to the new location of a tag. For example, if a duplicate of the tag Child is created as a child tag of the tag StepParent (i.e., "StepParent.Child") rather than deleting the original tag Child and possibly leaving the invalid reference to the original tag Child, the original tag Child located at Parent.Child can be modified to include a secondary reference to the new tag Child located at StepParent.Child. An application using or otherwise executing the content item (such as a web page displaying the content item) referencing the Child tag at Parent.Child is re-directed to the new tag Child located at StepParent.Child.

In an exemplary embodiment, a content management application executed by a processor of a computing system can modify a taxonomy hierarchy including multiple tags. Each tag can include a description, for example, identifying a category for the content items in a content repository. Such a content repository can include at least one content item having a primary reference identifying a first tag of the taxonomy hierarchy. The first tag can include a first description with which the content item is associated. Modifying the taxonomy hierarchy can invalidate the primary reference, for example, by preventing the reference from identifying the first tag by its position in the hierarchy. The content management application can generate a secondary reference in the taxonomy hierarchy. The secondary reference can be identified by the primary reference and can identify a second tag including the first description. A secondary reference can include, for example, a pointer from the first tag to the second tag. The content management application can receive an input referencing the first tag by the primary reference. The content management application can direct the input to the second tag via the secondary reference.

As used herein, the term "tag" is used to refer to a record including a description that may be associated with a content item. The description can include one or more words identifying a category. Examples of a description include, but are not limited to, a keyword or label associated with a content item.

As used herein, the term "taxonomy hierarchy" is used to refer to an organization of tags based on relationships between tags. A taxonomy hierarchy can include (but is not limited to) associating tags using one or more parent-child relationships. For example, a "parent" tag can identify a broad category and can be positioned in the hierarchy at a higher level than a "child" tag identifying a sub-category of the broad category.

As used herein, the term "content item" is used to refer to any item of data included in a collection of data. A content item can include, for example, text, an image, a video, an audio file, a combination of one or more texts, images, video, audio content, etc. The content items can be stored in a content repository.

As used herein, the term "content repository" is used to refer to a collection of content items. A content repository can be associated with a set of procedures for data management, search, and access. The set of procedures associated with the content repository can be independent of the applications accessing the content repository.

In an exemplary embodiment, modifying the taxonomy hierarchy can include, in effect, "moving" the tag to a new position within the taxonomy hierarchy such that its relationships (e.g., parent-child, etc.) to other tags is changed. To implement such a move, the content management application can create the second tag at a position in the taxonomy hierarchy that is different from the position of the first tag in the taxonomy hierarchy and modify the second tag such that the second tag includes the first description. The content management application can modify the first tag such that the description associated with the first tag is removed from the first tag. In an exemplary embodiment, to avoid invalidating existing references to the first tag, the content management application can generate the secondary reference in the taxonomy hierarchy by modifying the first tag to include the secondary reference. For example, a content management application can add a description from the first tag to the second tag, delete the description from the first tag, and add to the first tag the secondary reference identifying the position of the second tag. Accordingly, the position of a tag having the description has, in effect, moved from the position of the first tag in the taxonomy hierarchy to the position of the second tag in the taxonomy hierarchy.

In additional or alternative embodiments, "moving" a tag more than once can result in a multiple secondary references identifying the new position of the tag in the taxonomy hierarchy. The multiple secondary references can form a chain of references from the primary reference to the position of the tag. For example, a tag that has been moved twice may include an initial secondary reference identifying the position of the second tag. The second tag may include an additional secondary reference identifying the position of a third tag that includes the first description.

In additional or alternative embodiments, modifying the taxonomy hierarchy can include "merging" the tags. Merging the tags can include the content management application adding the first description included in the first tag to a second description included in the second tag. For example, a first tag may include a first description having a value "ocean animals" and a second tag may include a second description having a value "sea animals." Thus, the description included in the first tag overlaps with the second tag. Accordingly, the second tag can be modified to such that the second description has the value "sea animals, ocean animals." Merging tags can also include combining tags having identical content. For example, if a first tag includes a first description having a value "ocean animals" and a second tag includes a second description having a value "sea animals," then the taxonomy hierarchy may be modified such that the tag "ocean animals" is no longer used to describe and/or categorize content items. The content management application can remove the description "ocean animals" from the first tag.

In additional or alternative embodiments, the second tag can be modified to include a tertiary reference to the first tag. A tertiary reference can include, for example, a pointer from the second tag to the first tag. The content management application can use a tertiary reference to identify a tag that has been "moved" to a new position in the taxonomy hierarchy or "merged" with a second tag in the taxonomy hierarchy. The second tag can include one or more tertiary references. For example, a description included in a Tag A may be moved to a Tag B and a description included in a Tag C may be merged with a description included in Tag B. The Tag B can be modified to include tertiary references to Tag A and Tag C. A content management application, upon deleting Tag B, can use the tertiary references to Tag A and Tag C to identify those tags in the taxonomy hierarchy and delete them.

In additional or alternative embodiments, the content management application can "hide" the first tag so as to prevent the creation of new references associating content items with the first tag. Hiding the tag can include preventing a tag title associated with the first tag from being included in a listing of available tag titles by an application accessing the content item referencing the first tag. A tag title can be an identifier associated with the tag. The tag title can be displayed in an interface accessing the tags. The tag title displayed at an interface can be different from an identifier used by the content management application to reference the tag. In some embodiments, the tag title and the description can be different attributes of a tag. In other embodiments, the tag title and the description can be the same attribute of a tag. The content management application can cause a tag title associated with the second tag to the listing of available tag titles.

For example, an application providing a content item for display can generate a listing of available tags. The listing may be displayed using a graphical interface or other suitable interface. The application can generate the listing from the tag titles associated with any tags that the content management application has not marked as hidden. A listing of available tags can exclude any tags deleted from the taxonomy hierarchy.

In additional or alternative embodiments, the content management application can manage the deletion of tags having one or more child tags with secondary references to other tags. Deleting a tag in a taxonomy hierarchy can include deleting the children of the tag. The content management application can determine that a parent tag to be deleted includes a child tag including secondary references to other tags. The content management application can hide the parent tag instead of deleting the parent tag. Hiding the parent tag can include preventing the parent tag from being displayed in a listing of available tags by an application accessing one or more content items. Hiding the parent tag can also include causing references to the parent tag to be ignored. Hiding the parent tag, rather than deleting the parent tag, can allow references to the child tag to be resolved to the tag identified by the secondary reference in the child tag and can prevent the parent tag from being used to categorize content items.

For example, a first tag "Child" located at Grandparent.Parent.Child may be moved by creating a second tag "Child" at a position StepParent.Child. The tag "Child" at the position Grandparent.Parent.Child can include a secondary reference to the tag "Child" at a position StepParent.Child. A content management application can receive input to delete the tag "Parent." To prevent the deletion of the tag "Child" at position Grandparent.Parent.Child" having a secondary reference, the content management application can hide the tag "Parent" to prevent the tag "Parent" from being included in any listing of available tags. The content management application can cause input referencing the tag "Grandparent.Parent" to be ignored. The content management application can resolve a references identifying "Grandparent.Parent.Child" to "StepParent.Child." Thus, the content management application can modify the taxonomy hierarchy such that the tag "Parent" has effectively been "deleted" without disturbing the resolution of references to the tag Child at the position "Grandparent.Parent.Child."

In additional or alternative embodiments, the content management application can manage "moving" a tag back to its previous position in the taxonomy hierarchy. The content management application can, for example, move a description associated with the tag to another tag in the taxonomy hierarchy with which the description was previously associated. Moving a tag back to previous position in the taxonomy hierarchy can include determining if a new, conflicting tag has been created at the previous position in the taxonomy hierarchy. A conflicting tag can be, for example, a new tag created at the previous position after removing a previously "moved" tag. Moving a tag back to the previous position after a new tag has been created at the position can cause a non-unique path to be created in the taxonomy hierarchy. The content management application can resolve the conflict by appropriately modifying the tag being moved to its previous position.

For example, a tag Child having a description "One" can be located at a position Parent.Child. The tag Child can be "moved" to a position StepParent.Child. The tag Child at the position Parent.Child can be modified to include a secondary reference to the tag Child at the position StepParent.Child. Upon determining that no content items reference the Child at the position Parent.Child, the content management application can remove the tag Child at the position Parent.Child having a secondary reference to the tag Child at the position StepParent.Child. A tag Child having a description "Two" can be created at the position Parent.Child. Moving the tag Child having the description "One" at the position StepParent.Child back to the position Parent.Child can thus present a conflict with the tag Child having a description "Two" at the position Parent.Child. To resolve the conflict, the content management application can rename the tag Child having the description "One" to Child1 and move the tag Child1 to the position Parent.Child1.

In additional or alternative embodiments, the content management application can update invalidated references to the first tag. The content management application can determine that one or more content items include the primary reference identifying the first tag. The content management application can modify the one or more content items such that the primary reference included in each of the one or more content items identifies the second tag rather than the first tag.

In additional or alternative embodiments, the content management application can determine that no content item in the content repository includes the primary reference identifying the first tag and delete the first tag from the taxonomy hierarchy. For example, over a period of time, the content items referencing the first tag can be updated to reference the second tag. The content management application can conduct a periodic search for references to the first tag in the content items in the content repository. If the content management application determines that no such references exist, the content management application can delete the first tag.

These illustrative examples are given to introduce the reader to the general subject matter discussed here and are not intended to limit the scope of the disclosed concepts. The following sections describe various additional embodiments and examples with reference to the drawings in which like numerals indicate like elements.

The features discussed herein are not limited to any particular hardware architecture or configuration. A computing device can include any suitable arrangement of components that provide a result conditioned on one or more inputs. Suitable computing devices include multipurpose microprocessor-based computer systems accessing stored software that programs or configures the computing system from a general-purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Referring now to the drawings, FIG. 1 is a modeling diagram illustrating a content repository 100 having content items 106a-n and a taxonomy hierarchy 102 of tags 104a-m. The content repository 100 can be a storage subsystem of a computing system. Such computing system can include (but are not limited to) a server system, a cloud computing system, and/or a grid computing system.

The content repository 100 can include the tags 104a-m and the content items 106a-n. The content items 106a-n can be organized using categories described in the tags 104a-m. Accordingly, the number of the content items 106a-n can exceed the tags 104a-m. Although FIG. 1 depicts the tags 104a-m and the content items 106a-n stored in the same content repository 100, the tags 104a-m and the content items 106a-n can be stored in different content repositories.

The taxonomy hierarchy 102 can be a hierarchical organization of the tags 104a-m. In an exemplary embodiment, each of the tags 104a-m can be associated with one or more of a "parent" tag and a "child" tag. A parent tag can describe a broad category. A child tag can describe a subcategory of the broad category. A child tag can in turn have its own child tags. For example, a parent tag may be used to describe and/or categorize the content items as "Ocean Animals." Child tags of the parent tag "Ocean Animals" can be used to sub-categorize the content items as "Mammals," "Fish," or "Crustaceans." The child tag "Mammals" can be associated with additional child tags for further categorizing the content items as "Whales" or "Dolphins."

Figure 2:
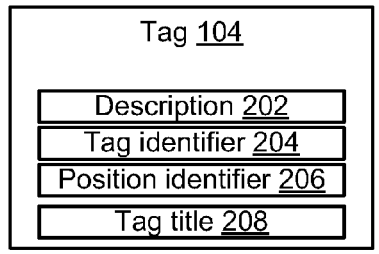
FIG. 2 is a modeling diagram illustrating an exemplary tag of a taxonomy hierarchy.

FIG. 2 is a modeling diagram illustrating an exemplary tag 104 of a taxonomy hierarchy 102. The tag 104 can include one or more data fields. As depicted in FIG. 2, the tag 104 includes data fields such as a description 202, a tag identifier 204, a position identifier 206, and a tag title 208.

Description 202 can include data identifying a category to which the content items 106a-n can belong. The data identifying the category can be, for example, a number or sequence of numbers, a string of text, binary data, ASCII text, etc. For example, the content items 106a-n can include different types of animals. A tag 104 may include a description 202 including text for classifying the animals, such as "Ocean Animals", "Mammals", "Fish," "Crustaceans", etc.

An application using a tag 104 can reference the tag 104 by its description 202. For example, an application can present an interface for categorizing the content items 106a-n. The interface can present a listing of available tags 104a-m. For each of the available tags 104a-m, the application can display the tag title 208 associated with the tag.

Although FIG. 2 depicts the description 202 and the tag title 208 as separate attributes of the tag 104, other implementations are possible. For example, a tag 104 can omit the tag title 208 and an interface generating a listing of available tags can display the description 202 associated with the tag.

Tag identifier 204 can include data including a unique identifier for the tag 104 within the content repository 100. The data identifying the tag can be, for example, an alphanumeric string. The tag identifier 204 can be used by a computing system to identify or reference the tag 104.

Position identifier 206 can include data identifying the position of the tag 104 in the taxonomy hierarchy 102. For example, the position identifier 206 can identify a "parent" tag and a "child" tag for the tag 104.

Tag title 208 can include an identifier associated with the tag 104 to be displayed at an interface of an application using the tag 104. A tag 104 can have a single tag title 208 or multiple tag titles 208. For example, a tag 104 can include multiple tag titles in multiple languages, thereby allowing a language-specific display of the tag at an application using the tag.

Figure 3:
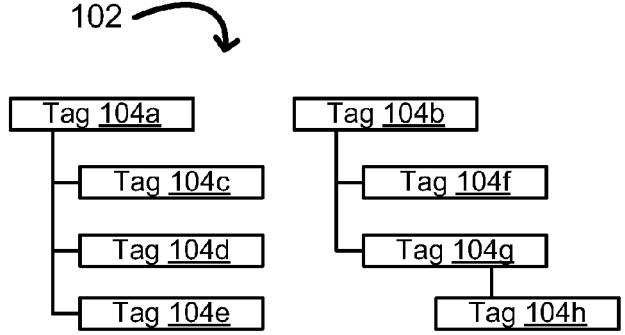
FIG. 3 is a modeling diagram illustrating relationships between the tags in an exemplary taxonomy hierarchy.

The taxonomy hierarchy 102 can be determined from the value of position identifier 206. FIG. 3 is a modeling diagram illustrating relationships between the tags 104a-h in an exemplary taxonomy hierarchy 102. The tag 104a is a parent tag of the tags 104c-e. The value of position identifier 206 for the tag 104a can therefore identify that tag 104a is a parent of the tags 104c-e and that tag 104a has no parent of its own. The value of position identifier 206 for each of the tags 104c-e can identify that the 104c-e are children of tag 104a. The tag 104b is a parent tag of the tags 104f, 104g. The value of position identifier 206 for the tag 104b can therefore identify that tag 104b is a parent of the tags 104f, 104g and that tag 104b has no parent of its own. The value of position identifier 206 for each of the tags 104f, 104g can identify that the tags 104f, 104g are children of tag 104b. The tag 104g is also a parent tag of the tag 104h. The value of position identifier 206 for the tag 104b can therefore identify that tag 104g is a child of the tag 104b and is a parent of the tag 104h.

The content items 106a-n in the content repository 100 can be organized using the tags 104a-m. An exemplary embodiment of organizing the content items using the tags of a taxonomy hierarchy is depicted in FIGS. 4 and 5.

Figure 4:
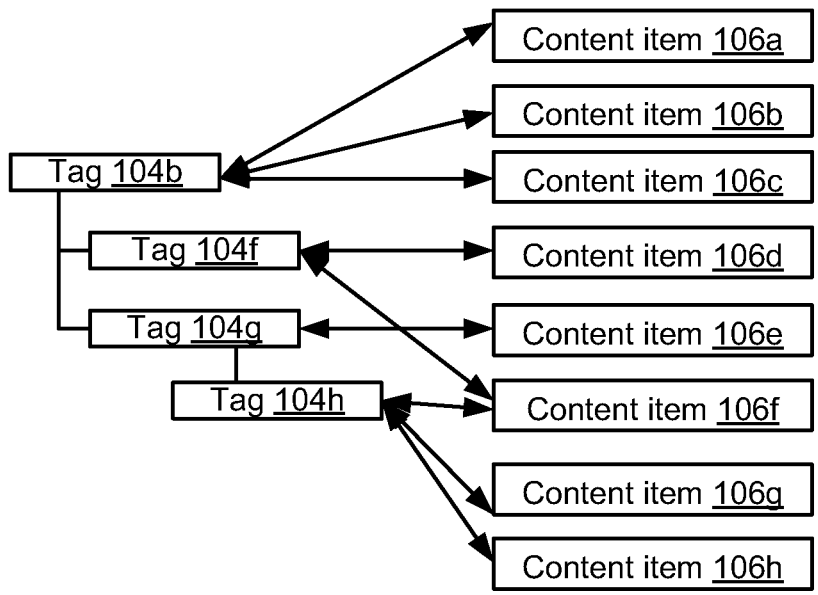
FIG. 4 is a modeling diagram illustrating relationships between the tags of a taxonomy hierarchy and the content items in a content repository.

FIG. 4 is a modeling diagram illustrating relationships between the tags 104b-h of the taxonomy hierarchy 102 and the content items 106a-f in the content repository 100. A tag can be associated with multiple content items. For example, the content items 106a-c are associated with tag 104b, the content items 106d, 106f are associated with tag 104f, and the content items 106f-h are associated with tag 104h. A content item can be associated with multiple tags. For example, content item 106f is associated with the tags 104f, 104h.

The content items associated with a child tag are likewise associated with the parent tag. For example, a command to retrieve all the content items associated with tag 104b would return the content items 106a-f associated with either the parent tag 104b or one of its child tags 104f, 104g.

Figure 5:
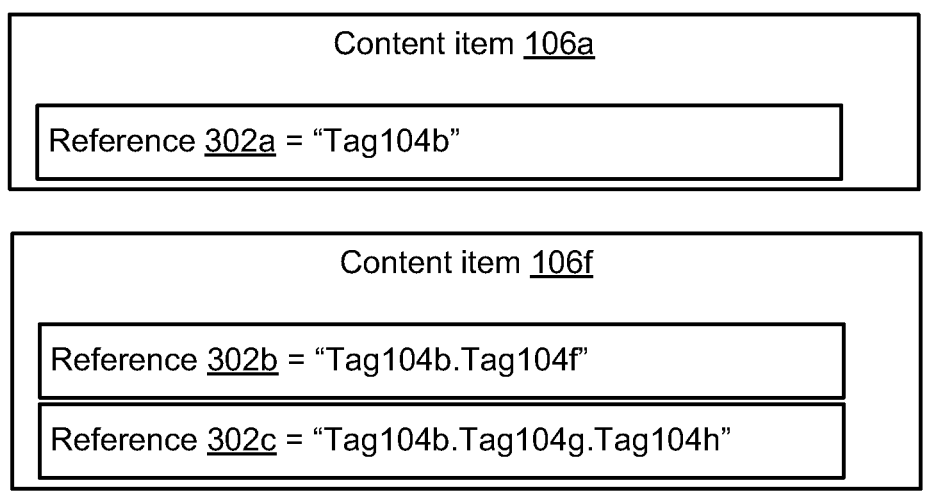
FIG. 5 is a modeling diagram illustrating exemplary content items referencing the tags of a taxonomy hierarchy.

FIG. 5 is a modeling diagram illustrating exemplary content items 106a, 106f referencing the tags of the taxonomy hierarchy 102. A content item can be associated with a tag via a reference, such as references 302a-c of the content items 106a, 106f. Each of the references 302a-c can be any data identifying the tag with which the content item is associated, such as a string identifying the position of a tag in the taxonomy hierarchy 102. For example, as depicted in FIG. 5, the reference can identify the path from a parent tag 104b to the tags 104f, 104h. A content item 106a can include a reference 302a identifying a tag 104b by its position (e.g., "Tag104b"). A content item 106h can include a reference 302b having a value identifying a tag 104f by its position (e.g., "Tag104b.Tag104f") and a reference 302c identifying a tag 104h by its position (e.g., "Tag104b.Tag104g.Tag104h").

An application can use the relationship between a tag and a content item to retrieve all content items that are associated (or "tagged") with a given tag. For example, an application can access a general-purpose search index of the content repository 100 to identify a tag 104 by a tag identifier 204. The application can identify a position of the tag 104 in the taxonomy hierarchy 102. The application can search for all content items having a reference to the tag 104 at the position in the hierarchy.

Modifying the taxonomy hierarchy 102 can inadvertently invalidate a reference in a content item 106 associating the content item 106 with a tag 104. An example of inadvertently invalidating a reference is depicted in FIGS. 6-7.

Figure 6:
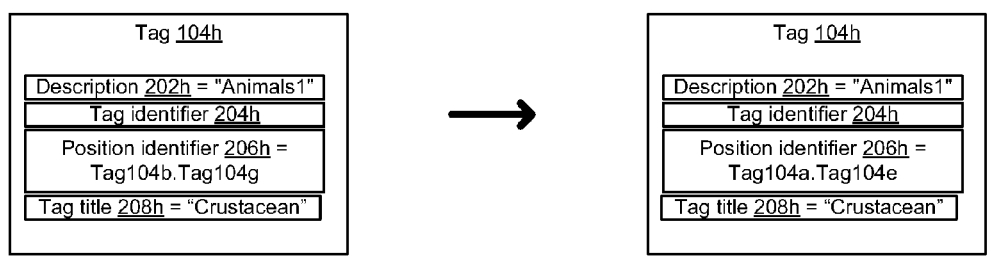
FIG. 6 is a modeling diagram illustrating an exemplary modification to a position of a tag.
Figure 7:
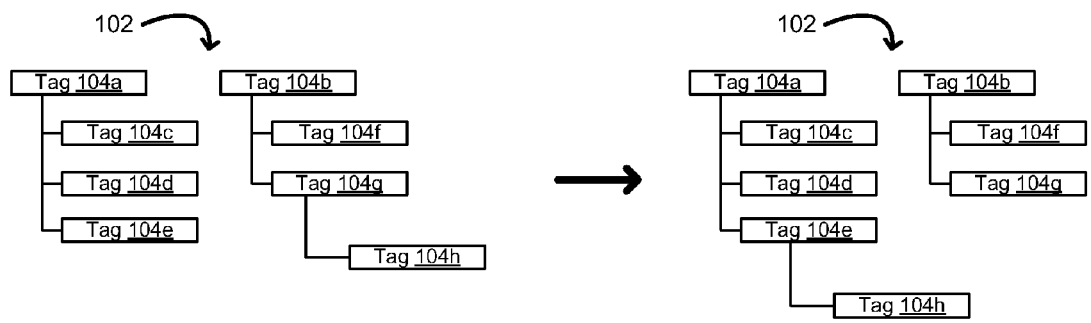
FIG. 7 is a modeling diagram illustrating the effect of a modifying a position of a tag on a taxonomy hierarchy including the tag.

FIGS. 6-7 are modeling diagrams that illustrate modifying a taxonomy hierarchy by modifying a position of a tag. FIG. 6 is a modeling diagram illustrating an exemplary modification to a position identifier 206h of a tag 104h. FIG. 7 is a modeling diagram illustrating the effect of a modifying a position of a tag 104h on a taxonomy hierarchy 102 including the tag 104h.

As depicted in FIG. 6, the value of the position identifier 206h of the tag 104h is changed from "Tag104b.Tag104g" to "Tag104a.Tag104e." The associated change of the position of tag 104h in the taxonomy hierarchy 102 is depicted in FIG. 7.

Modifying the position identifier 206h of the tag 104h in the taxonomy hierarchy 102 can invalidate a reference in a content item to the tag 104h. Invalidating a reference can include causing the reference to identify the tag 104h at a position in a taxonomy hierarchy 102 other than the position at which the tag 104h is located.

For example, an entity can have access rights to modify the taxonomy hierarchy 102 and lack access rights to modify the content items 106a-n. The entity can thus modify the position identifier 206h of a tag 104h, as depicted in FIGS. 6-7, and leave references to tag 104h in one or more content items unmodified. Modifying a position identifier 206h of a tag 104h without modifying any references to the position of the tag 104h can invalidate a reference 302c included in a content item 106f depicted in FIG. 5. The reference 302c thus identifies the position of the tag 104h as "Tag104b.Tag104g.Tag104h" rather than "Tag104a.Tag104e.Tag104h." An application using the content item 106f and retrieving all the content items associated with the tag identified by reference 302c would therefore retrieve a null set rather than the content items 106g, 106h.

Changes to the taxonomy hierarchy 102 can be managed such that references to the tags 104h are not invalidated. An exemplary embodiment illustrating such a management of changes to the taxonomy hierarchy 102 is depicted in FIGS. 8-9.

Figure 8:
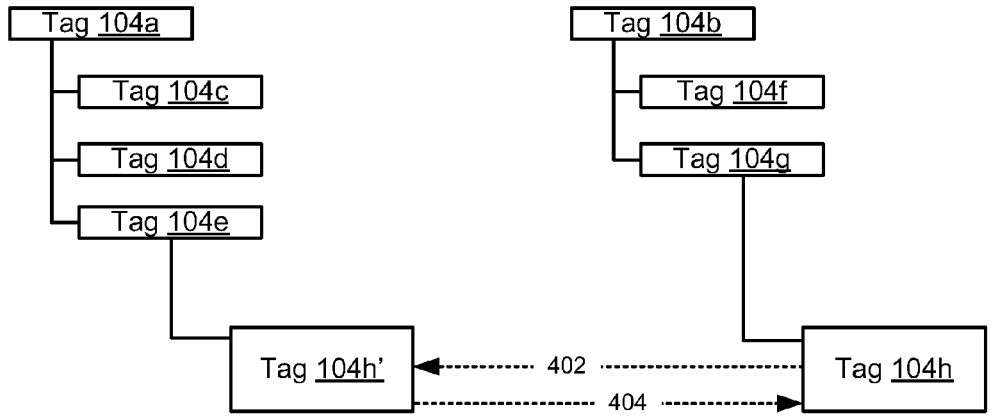
FIG. 8 is a modeling diagram illustrating managing a modification to a taxonomy hierarchy to address inadvertent invalidation of a reference to a tag.
Figure 9:
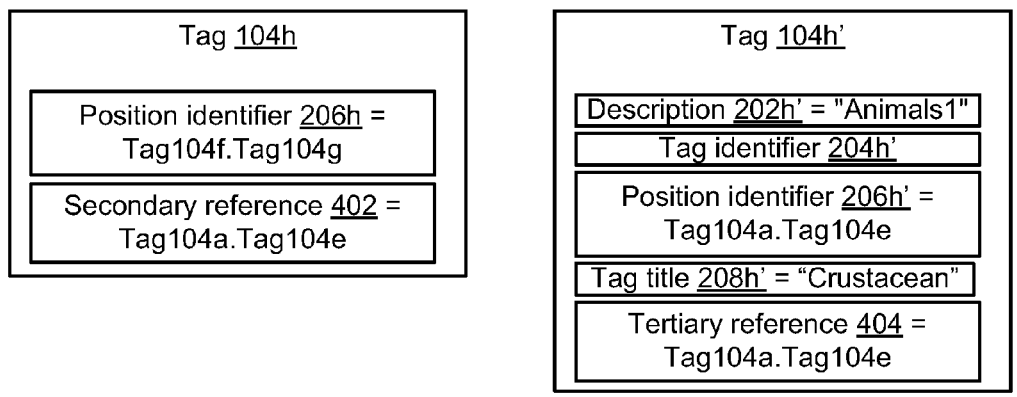
FIG. 9 is a modeling diagram illustrating managing a modification to a taxonomy hierarchy by generating a secondary reference to a new tag.

FIGS. 8-9 are modeling diagrams that illustrate managing references to a tag 104h during a modification to the taxonomy hierarchy 102. FIG. 8 is a modeling diagram illustrating managing a modification to a taxonomy hierarchy 102 to address inadvertent invalidation of a reference to a tag 104h. FIG. 9 is a modeling diagram illustrating managing a modification to a taxonomy hierarchy 102 by generating a secondary reference 402 to a new tag 104h.

A new tag 104h' can be generated in the taxonomy hierarchy 102 as a child tag of the tag 104e, as depicted in FIG. 8. The new position is reflected as a position identifier 206h' for tag 104h' having a value of "Tag104a.Tag104e," as depicted in FIG. 9. The tag 104h' can include description 202h' having a value "Animals1" that is identical to the description 202h included in the tag 104h and having a value of "Animals1," as depicted in FIG. 6. The tag 104h can remain positioned in the taxonomy hierarchy 102 as a child of the tag 104g, as depicted in FIG. 9, with a value for the position identifier 206h of "Tag104b.Tag104g." The tag 104h can be modified to include a secondary reference 402 to the position identifier 206h'. Thus, a reference 302c included in a content item 106f identifies a tag 104h at the position Tag104b.Tag104g. Such a reference 302c to the position of position identifier 206h can be resolved to the position of position identifier 206h' via the secondary reference 402.

In additional or alternative embodiments, the tag 104h' can be modified to include a tertiary reference 404 to the position identifier 206h of the tag 104h. The tertiary reference 404 can identify that the tag 104h that has been "moved" to a new position in the taxonomy hierarchy 102 by moving the description "Animals1" from the tag 104h to the tag 104h'. Deleting the tag 104h' can include identifying any tags including secondary references to the tag 104h', such as the tag 104h, and deleting those tags including the secondary references to the tag 104h'.

Although FIG. 9 depicts the tag 104h' as having a single tertiary reference 404, a tag can include any number of tertiary references (including none).

Figure 10:
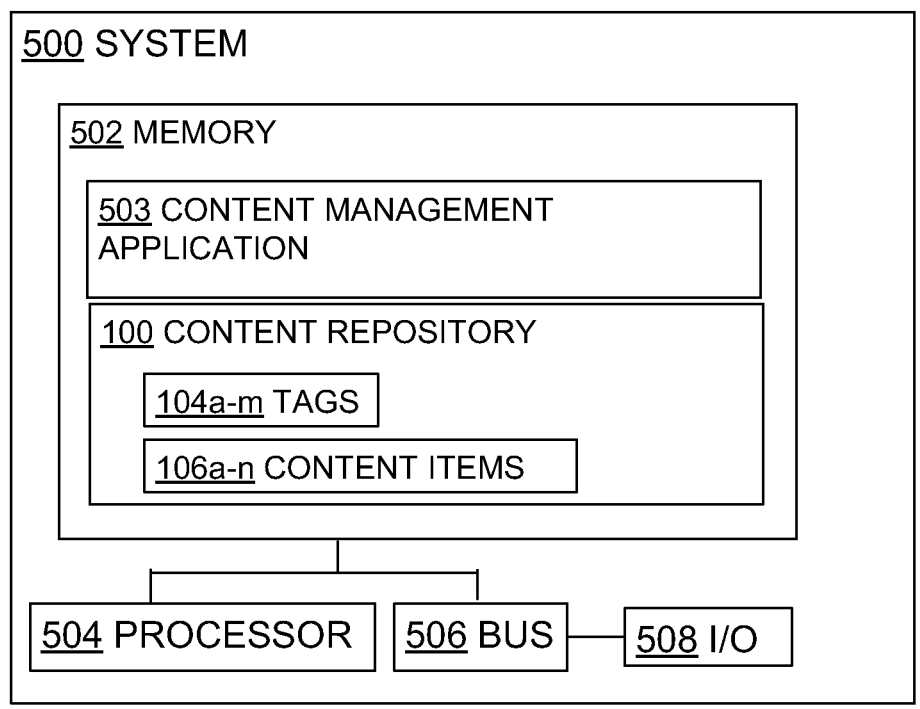
FIG. 10 is a block diagram depicting exemplary computing devices in an exemplary computing environment for implementing certain embodiments.

FIG. 10 is a block diagram depicting exemplary computing devices in an exemplary computing environment for implementing certain embodiments. Content management application 503 executes or is otherwise used on the exemplary system 500 and is shown using functional components or modules. As is known to one of skill in the art, such an application may be resident in any suitable non-transitory computer-readable medium and can be executed on any suitable processor.

For example, as shown, an exemplary system 500 can include a non-transitory computer-readable medium, such as a random access memory (RAM) 502, coupled to a processor 504 that executes computer-executable program instructions and/or accesses the content management application stored in a memory 502. Such a processor 504 may include a microprocessor, an application-specific integrated circuit (ASIC), a state machine, or other processor, and can be any of a number of computer processors. Such a processor can include, or may be in communication with, a non-transitory computer-readable medium which stores instructions that, when executed by the processor 504, cause the processor 504 to perform the steps described herein.

A non-transitory computer-readable medium may include, but is not limited to, an electronic, optical, magnetic, or other storage device capable of providing a processor with computer-readable instructions. Other examples include, but are not limited to, a floppy disk, CD-ROM, DVD, magnetic disk, memory chip, ROM, RAM, an ASIC, a configured processor, optical storage, magnetic tape or other magnetic storage, or any other medium from which a computer processor can read instructions. The instructions may include processor-specific instructions generated by a compiler and/or an interpreter from code written in any suitable computer-programming language, including, for example, C, C++, C#, Visual Basic, Java, Python, Perl, JavaScript, and ActionScript.

The system 500 can receive input and provide output via input/output (I/O) interface 508. I/O interface 508 can include, for example, a network interface for communication via a network. A bus, such as bus 506, is included in the system 500. The system 500 can be any type of computing system included in a network at a domain appropriate for providing one or more of the features described herein.

FIG. 10 illustrates an exemplary system 500 that includes, in a memory 502, the content management application 503. The content management application 503 can configure the processor 504 to retrieve tags 104a-m or content items 106a-n and load the tags 104a-m or the content items 106a-n into the memory 502. The content management application 503 can configure the processor 504 to modify the tags 104a-m or the content items 106a-n in response to input received via I/O interface 508.

Although FIG. 10 depicts the tags 104a-m and the content items 106a-n stored in memory 502, either or both of the tags 104a-m and the content items 106a-n can be stored in a storage system separate from system 500. Examples of such storage systems include, but are not limited to, dedicated server devices, cloud computing systems, and/or grid computing systems. Such storage systems can be accessed by the system 500 via the I/O interface 508.

Figure 11:
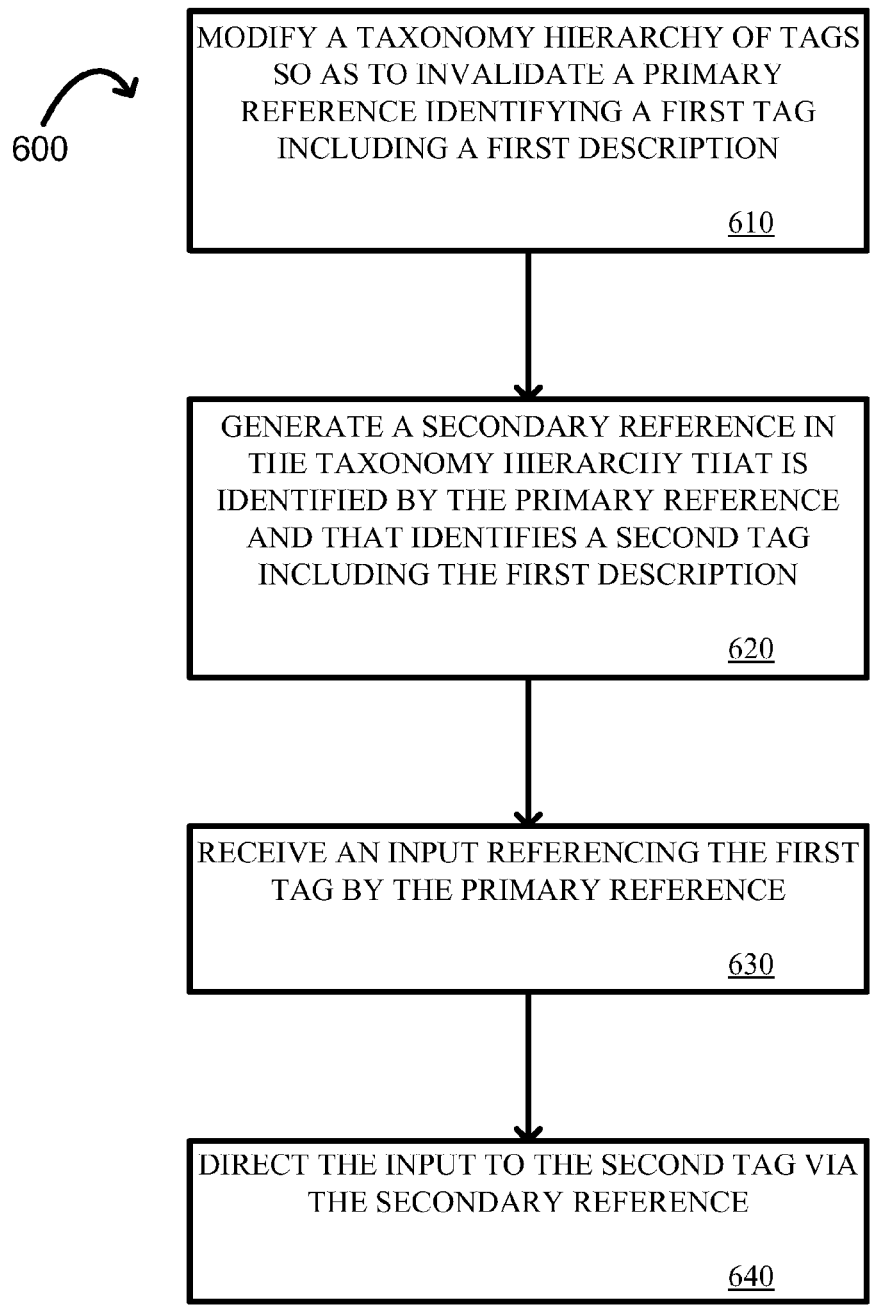
FIG. 11 is a flow chart illustrating an exemplary method for managing references to a tag during modification to a taxonomy hierarchy.

FIG. 11 is a flow chart illustrating an exemplary method 600 for managing references to a tag during modification to a taxonomy hierarchy 102. For illustrative purposes, the method 600 is described with reference to the elements of the flow of communications depicted in FIGS. 8-9 and the system implementation depicted in FIG. 10. Other implementations, however, are possible.

The exemplary method 600 involves modifying a taxonomy hierarchy 102 of tags, as shown in block 610. The content management application 503 can modify the taxonomy hierarchy 102. A content repository can include at least one content item, such as content item 106f having a primary reference 302c identifying a first tag 104h of the taxonomy hierarchy 102. The first tag 104h can include a first description, such as description 202h. Modifying the taxonomy hierarchy 102 can invalidate the primary reference 302c.

In an exemplary embodiment, modifying the taxonomy hierarchy 102 can include the content management application 503 "moving" the description 202 associated with the first tag 104h to the second tag 104h'. The content management application 503 can create a second tag 104h' in the taxonomy hierarchy 102. The second tag 104h' can be created at a second position in the taxonomy hierarchy 102 that is different from a first position of the first tag 104h in the taxonomy hierarchy 102. The content management application 503 can modify the second tag 104h' such that the second tag 104h' includes the first description 202h in description 202h'. In some embodiments, the content management application 503 can delete the first description 202h from the first tag 104h.

In additional or alternative embodiments, the content management application 503 can "hide" the first tag 104h. For example, an application using the content items 106a-n can include an interface for categorizing the content items 106a-n using the tags. The interface can list the tags 104a-m by the tag titles associated with the tags 104a-m. A listing of available tags can associate a tag title with the position of the tag associated with the tag title. Hiding the first tag 104h can include the content management application 503 removing a tag title associated with the first tag 104h from a listing of available tag titles to be provided for display. The content management application 503 can also add a second tag 104h' identifier associated with the second tag 104h' to the listing of available tag titles.

For example, a tag 104h having a tag title 208h of "Crustacean" can be included in a listing as an item reading "Crustacean: Tag104b.Tag104g.Tag104h." After creating a tag 104h' including the description and title of tag 104h, the content management application can remove from the listing the item "Crustacean: Tag104b.Tag104g.Tag104h" and add to the listing the item "Crustacean: Tag104a.Tag104e.Tag104h."

In additional or alternative embodiments, modifying the taxonomy hierarchy 102 can include the content management application 503 "merging" the first description 202 with an existing description 202 in the second tag 104h'. The second tag 104h' can include a second description 202 different from the first description 202. The content management application 503 can modify the second tag 104h' to include both the first description 202 and the second description 202. For example, the content management application 503 can append the first description 202 to the second description 202.

The exemplary method 600 further involves generating a secondary reference 402 in the taxonomy hierarchy 102, as shown in block 620. The content management application 503 can generate the secondary reference 402. The secondary reference 402 can be identified by the primary reference 302c. The secondary reference 402 can identify the second tag 104h' including the first description 202.

In an exemplary embodiment, generating the secondary reference 402 can include the content management application modifying the first tag 104h such that the first tag 104h includes the secondary reference 402.

The exemplary method 600 further involves receiving an input referencing the first tag 104h by the primary reference 302c, as shown in block 630. The content management application 503 can receive the input referencing the first tag 104h by the primary reference 302c. The input can be provided by an application using one or more content items referencing the first tag 104h.

For example, an application, such as a web browsing application, may access a content item 106f, such as a web page. The web page may include a reference 302c to a tag 104h. The web browsing application may execute a command to retrieve all content items associated with the tag at reference 302c, i.e., the tag 104h. The web browsing application can provide the command to retrieve the content items to the content management application 503.

The exemplary method 600 further involves directing the input to the second tag 104h' via the secondary reference 402, as shown in block 640. The content management application 503 can direct the input to the second tag 104h'.

In an exemplary embodiment, the content management application 503 can access the first tag 104h based on receiving the input from the application. The content management application 503 can determine that the first tag 104h includes the secondary reference 402 identifying the second tag 104h'. The content management application 503 can access the second tag 104h' based on the secondary reference 402 identifying the second tag 104h'. For example, a content management application 503 can receive a command from a web browsing application to retrieve all content items associated with the first tag 104h. The content management application 503 can determine that the first tag 104h includes a secondary reference 402 to the second tag 104h'. The content management application 503 can retrieve the content items associated with the second tag 104h' and provide the content items to the web browsing application. Accordingly, even though the content item 106f includes a reference to a first tag 104h, inputs referencing the first tag 104h can be resolved to the second tag 104h' in a manner that is transparent to the application using the content item 106f.

In additional or alternative embodiments, the content management application 503 can permanently remove the first tag 104*h*. The content management application 503 can determine that no content item in the content repository includes a reference identifying the first tag 104*h* (i.e., a tag having a position Tag104b.Tag104g.Tag104h).

For example, over time, one or more entities with sufficient access rights to the content items 106*a-n* can update primary references identifying the first tag 104*h* such that the primary references identify the second tag 104*h*'. Periodically, an entity having sufficient access rights to the content repository 100 can use the content management application 503 to search all content items 106*a-n* in the content repository 100 and identify any for a reference having a value identifying the first tag 104*h*. The content management application 503 can determine that no content items include a reference to the first tag 104*h*. The content management application 503 can hide the first tag 104*h* such that no content items will subsequently be associated with the first tag 104*h*. Accordingly, the content management application 503 can delete the first tag 104*h* based on determining that no content items include a reference to the first tag 104*h*.

In additional or alternative embodiments, the content management application 503 can modify any reference identifying the first tag 104*h* such that the reference identifies the second tag 104*h*'. The content management application 503 can determine that one or more of content items 106*a-n* includes a reference identifying the first tag 104*h*. For example, an entity having sufficient access rights to the content repository 100 can use the content management application 503 to search all content items 106*a-n* in the content repository 100 and identify any for a reference having a value identifying the first tag 104*h*. The content management application 503 can modify the one or more content items such that the primary reference identifies the second tag 104*h*' rather than the first tag 104*h*. Modifying the one or more content items such that the primary reference identifies the second tag 104*h*' can allow the first tag 104*h* to be deleted after the next scheduled search for any content items with references to the first tag 104*h*.

Figure 12:
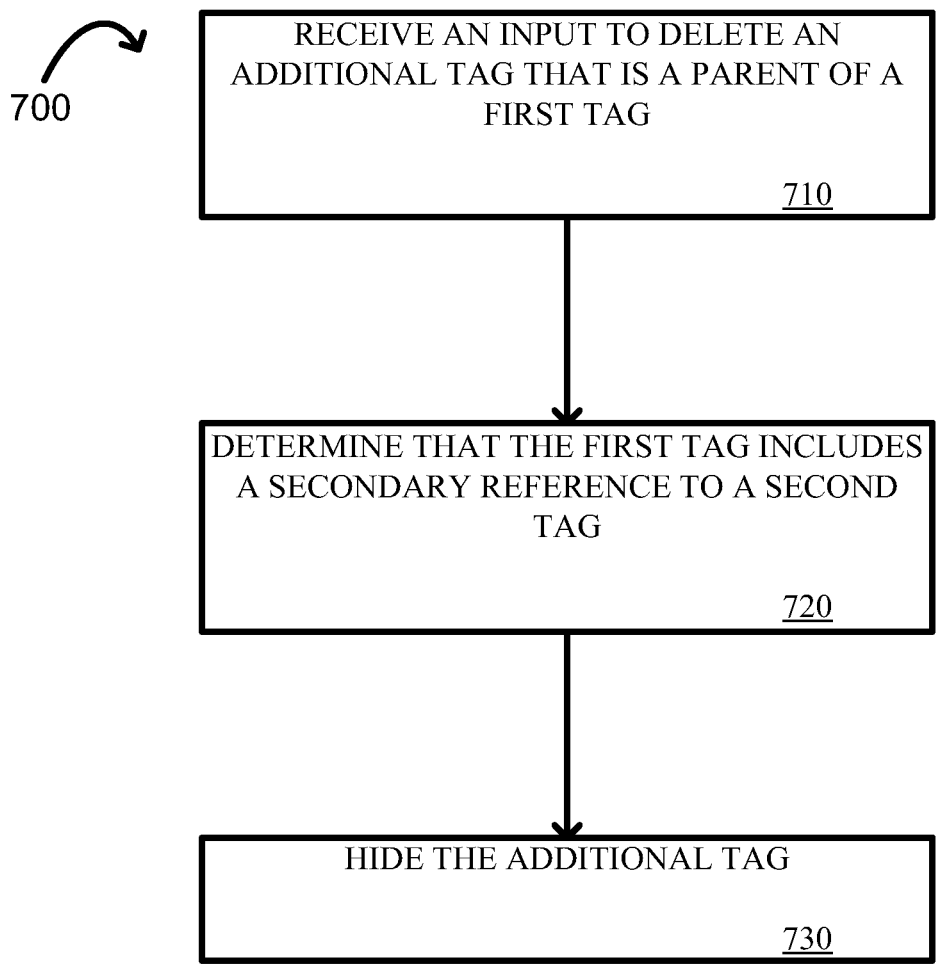
FIG. 12 is a flow chart illustrating an exemplary method for deleting a tag having a child tag including a secondary reference to another tag.

FIG. 12 is a flow chart illustrating an exemplary method 700 for deleting a tag having a child tag including a secondary reference to another tag. For illustrative purposes, the method 700 is described with reference to the elements of the flow of communications depicted in FIGS. 8-9 and the system implementation depicted in FIG. 10. Other implementations, however, are possible.

The exemplary method 700 involves receiving an input to delete an additional tag that is a parent of a first tag, as shown in block 710. The content management application 503 can determine that an additional tag is a parent of a first tag. For example, content management application 503 can determine, upon receiving a command to delete a tag 104*b*, that tag 104*a* includes child tags 104*f*, 104*g* and that child tag 104*g* itself includes a child tag 104*h*.

The exemplary method 700 further involves determining that the first tag includes a secondary reference, as shown in block 720. For example, the content management application 503 can determine that the tag 104*h* include a secondary reference 402 to the tag 104*h*'. Accordingly, deleting the tag 104*b* can delete the tag 104*h* and the secondary reference 402, thereby preventing input directed to the tag 104*h* from resolving to the tag 104'.

The exemplary method 700 further involves hiding the additional tag, as shown in block 730. For example, the content management application 503 can hide the tags 104*b*, 104*g*. Hiding the tag tags 104*b*, 104*g* can include preventing tag titles associated with the tags 104*b*, 104*g* from being included in a listing of available tag titles by an application accessing one or more content items 106*a-n* referencing the tags 104*b*, 104*g*. Hiding the tags 104*b*, 104*g* can also include causing input directed to the tags 104*b*, 104*g* to be ignored. For example, the content management application 503 can cause a query referencing to the category described or otherwise identified by the tag 104*b* to return a null set.

Figure 13:
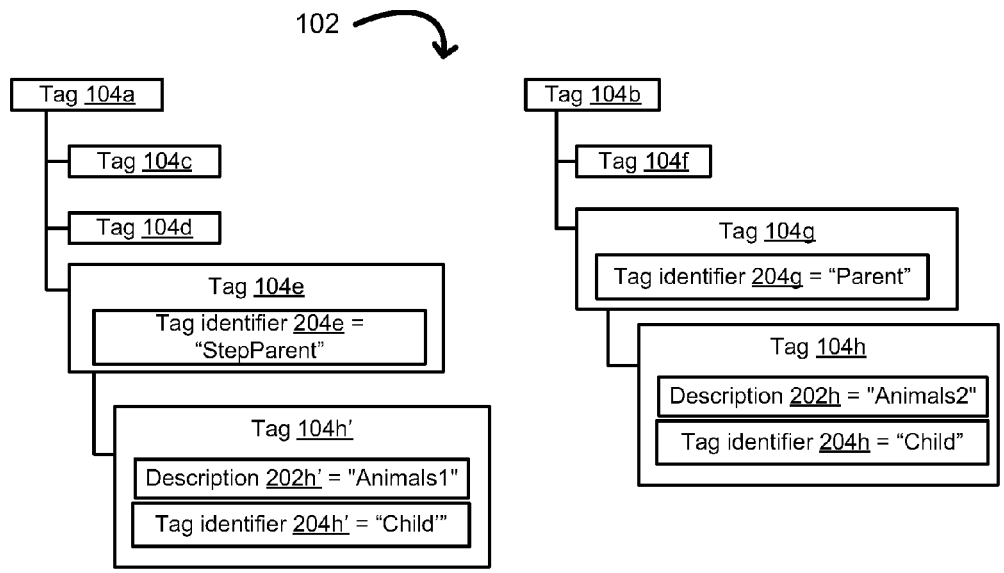
FIG. 13 is a modeling diagram illustrating a first tag conflicting with a second tag at a previous position of the description associated with the first tag.
Figure 14:
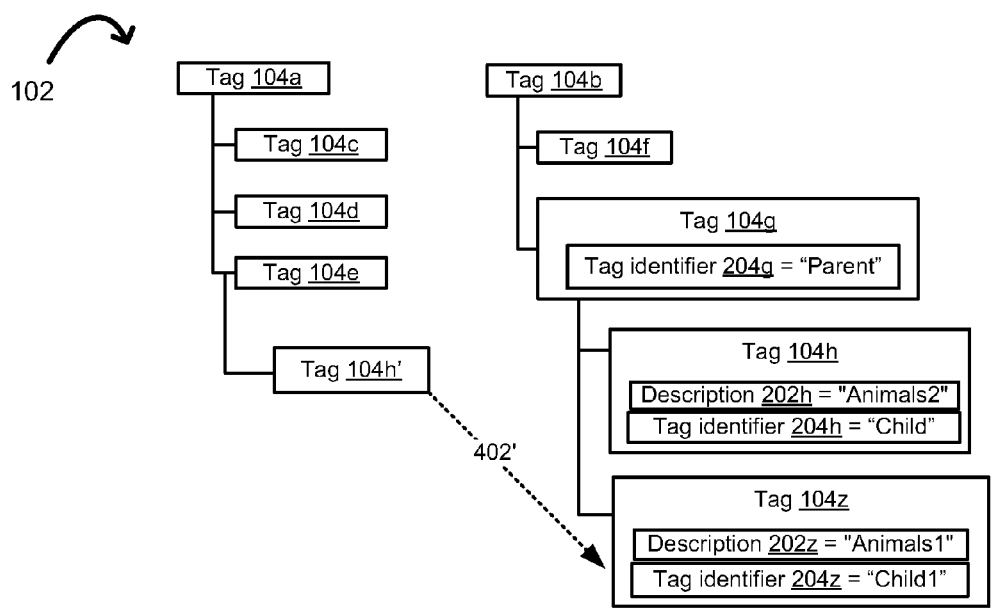
FIG. 14 is a modeling diagram illustrating resolving a conflict between tags at a common position in the taxonomy hierarchy.

FIGS. 13-14 depict moving a tag to a previous position in the hierarchy. Moving a tag to a previous position in the hierarchy can include resolving any conflicts with tags that may have been added in that position of the hierarchy.

FIG. 13 is a modeling diagram illustrating a first tag 104*h*' conflicting with a second tag 104*h* at a previous position of the first tag 104*h*'.

A tag 104*h* having a tag identifier 204*h* "Child" and a description "Animals1" can be a child of the tag 104*g* having a tag identifier 204*g* "Parent." The tag 104*h* can thus be located at a position Parent.Child. The tag 104*h* having a tag identifier 204*h* "Child" can be "moved" to a position Step-Parent.Child by creating a tag 104*h*' having a tag identifier 204*h*' "Child" that is a child of the tag 104*e* having a tag identifier 204*e* "StepParent." The tag 104*h* having a tag identifier 204*h* "Child" at the position Parent.Child can be removed upon determining that no content items reference the tag 104*h* having a description "Animals1" at the position Parent.Child.

As depicted in FIG. 13, a new tag 104*h* having a description 202*h* "Animals2" and having a tag identifier 204*h* "Child" can be created at the position Parent.Child. Thus, a conflict can be created by moving the tag 104*h*' having the description 202*h*' "Animals1" and the tag identifier 204*h*' "Child" back to the position Parent.Child in the taxonomy hierarchy 102. The tag 104*h*' having the tag identifier 204*h*' "Child" and the description "Animals1" can conflict with the tag 104*h* at the position Parent.Child having the description 202*h* "Animals2" and the tag identifier 204*h* "Child."

FIG. 14 is a modeling diagram illustrating resolving a conflict between tags 104*h*, 104*h*' at a common position in the taxonomy hierarchy 102. To resolve the conflict, the content management application can create a new tag 104*z* at the position Parent.Child of the taxonomy hierarchy 102. The tag 104*z* can have description 202*z* "Animals1" and a tag identifier 204*z* "Child1." The tag 104*h*' can be modified to include a secondary reference 402', allowing references to the tag having the description "Animals1" to resolve to the tag 104*z* at the position Parent.Child.

General

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Some portions are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is a self-consistent sequence of operations or similar processing leading to a desired result. In this context, operations or processing involves physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these and similar terms are to be associated with appropriate physical quantities and are merely convenient labels. Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multipurpose microprocessor-based computer systems accessing stored software that programs or configures the computing system from a general-purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art.

The invention claimed is:

1. A method comprising:
   receiving, by a processor, a modification request for a taxonomy hierarchy having a plurality of tags for categorizing content items of a content repository, wherein the content repository is accessible separately from the taxonomy hierarchy and comprises at least one content item having a first reference identifying a first tag of the taxonomy hierarchy, the first tag comprising a description for the at least one content item;
   determining, by the processor, that a modification requested by the modification request would cause the first reference included in the at least one content item to incorrectly identify a location of the first tag, wherein the modification request comprises a request for:
      modifying a second tag such that the second tag comprises the description for the at least one content item, wherein the second tag is at a second position in the taxonomy hierarchy different from a first position of the first tag in the taxonomy hierarchy, and
      deleting the first tag;
   modifying, by the processor, the first tag to include a second reference based on determining that the modification request would cause the first reference to incorrectly identify the location of the first tag, wherein the second reference is accessible using the first reference in response to an input requesting the first tag using the first reference and the second reference causes the input using the first reference to be redirected to the second tag in the taxonomy hierarchy having the description for the at least one content item; and
   modifying the taxonomy hierarchy based on the modification request, wherein a portion of the modification request for deleting the first tag is suppressed based on determining that the modification request would cause the first reference to incorrectly identify the location of the first tag.

2. The method of claim 1, further comprising:
   based on modifying the taxonomy hierarchy based on the modification request:
      preventing, by the processor, a tag title associated with the first tag from being included in a listing of available tag titles by an application accessing the at least one content item; and
      causing, by the processor, a second tag title associated with the second tag to be included in the listing of available tag titles.

3. The method of claim 1, wherein the second tag comprises an additional description, wherein the modification request comprises a request for merging the first tag and the second tag by adding the description for the at least one content item to the second tag and at least one of deleting the description from the first tag or deleting the first tag.

4. The method of claim 1, further comprising:
   receiving, by the processor, the input requesting the first tag using the first reference; and
   directing, by the processor, the input to the second tag via the second reference.

5. The method of claim 1, further comprising:
   receiving, by the processor, a request to delete an additional tag that is a parent of the first tag;
   determining, by the processor, that the first tag includes the second reference; and
   responding to the request by hiding, by the processor, the additional tag based on determining that the additional tag is the parent of the first tag including the secondary reference, wherein hiding the additional tag comprises:
      preventing a tag title associated with the additional tag from being included in a listing of available tag titles by an application accessing the at least one content item; and
      causing a second input referencing the additional tag to be ignored.

6. The method of claim 1, further comprising:
determining that no content item in the content repository includes the first reference identifying the first tag;
deleting the first tag from the taxonomy hierarchy.

7. The method of claim 1, further comprising:
determining, by the processor, that the at least one content item includes the first reference identifying the first tag; and
modifying the at least one content item such that the first reference included in the at least one content item identifies the second tag.

8. The method of claim 1, further comprising:
associating a first access right with the taxonomy hierarchy; and
associating a second access right with the content repository, wherein the first access right is associated with a different entity than the second access right.

9. A computing system comprising:
a processor configured for executing instructions stored in a non-transitory computer-readable medium to perform operations comprising:
receiving a modification request for a taxonomy hierarchy having a plurality of tags for categorizing content items of a content repository, wherein the content repository is accessible separately from the taxonomy hierarchy and comprises at least one content item having a first reference identifying a first tag of the taxonomy hierarchy, the first tag comprising a description for the at least one content item;
determining that a modification requested by the modification request would cause the first reference included in the at least one content item to incorrectly identify a location of the first tag, wherein the modification request comprises a request for:
modifying a second tag such that the second tag comprises the description for the at least one content item, wherein the second tag is at a second position in the taxonomy hierarchy different from a first position of the first tag in the taxonomy hierarchy, and
deleting the first tag;
modifying the first tag to include a second reference based on determining that the modification request would cause the first reference to incorrectly identify the location of the first tag, wherein the second reference is accessible using the first reference in response to an input requesting the first tag using the first reference and the second reference causes the input using the first reference to be redirected to the second tag in the taxonomy hierarchy having the description for the at least one content item; and
modifying the taxonomy hierarchy based on the modification request, wherein a portion of the modification request for deleting the first tag is suppressed based on determining that the modification request would cause the first reference to incorrectly identify the location of the first tag.

10. The computing system of claim 9, wherein the operations further comprise comprising preventing a tag title associated with the first tag from being included in a listing of available tag titles by an application accessing the at least one content item.

11. The computing system of claim 9, wherein the second tag comprises an additional description and wherein the modification request comprises a request for merging the first tag and the second tag, wherein merging the first tag and the second tag comprises adding the description for the at least one content item to the second tag and at least one of deleting the description from the first tag or deleting the first tag.

12. A non-transitory computer-readable medium embodying program code executable by a computer system, the non-transitory computer-readable medium comprising:
program code for receiving a modification request for a taxonomy hierarchy having a plurality of tags for categorizing content items of a content repository, wherein the content repository is accessible separately from the taxonomy hierarchy and comprises at least one content item having a first reference identifying a first tag of the taxonomy hierarchy, the first tag comprising a description for the at least one content item;
program code for determining that a modification requested by the modification request would cause the first reference included in the at least one content item to incorrectly identify a location of the first tag, wherein the modification request comprises a request for:
modifying a second tag such that the second tag comprises the description for the at least one content item, wherein the second tag is at a second position in the taxonomy hierarchy different from a first position of the first tag in the taxonomy hierarchy, and
deleting the first tag;
program code for modifying the first tag to include a second reference based on determining that the modification request would cause the first reference to incorrectly identify the location of the first tag, wherein the second reference is accessible using the first reference in response to an input requesting the first tag using the first reference and the second reference causes the input using the first reference to be redirected to the second tag in the taxonomy hierarchy having the description for the at least one content item; and
program code for modifying the taxonomy hierarchy based on the modification request, wherein a portion of the modification request for deleting the first tag is suppressed based on determining that the modification request would cause the first reference to incorrectly identify the location of the first tag.

13. The computer-readable medium of claim 12, further comprising program code for preventing a tag title associated with the first tag from being included in a listing of available tag titles by an application accessing the at least one content item.

14. The computer-readable medium of claim 12, wherein the second tag comprises an additional description and wherein the modification request comprises a request for merging the first tag and the second tag, wherein merging the first tag and the second tag comprises adding the description for the at least one content item to the second tag and at least one of deleting the description from the first tag or deleting the first tag.

15. The method of claim 1, wherein the secondary reference comprises a pointer to a location of the second tag in the taxonomy hierarchy.

16. The method of claim 1, further comprising determining that the modification request is received from an entity that is authorized to modify the taxonomy hierarchy and that is not authorized to modify the at least one content item.

17. The method of claim 1, wherein the input comprises a command to retrieve a plurality of content items from the content repository in a category identified by the first tag, and further comprising:
receiving the command;
identifying that the command identifies the first tag using the first reference;

selecting the first tag using the first reference;
determining that the first tag includes the second reference;
selecting the second tag using the second reference;
retrieving a plurality of content items in a category identified by the second tag; and
returning the plurality of content items in the category identified by the second tag in response to the command.

* * * * *